(12) United States Patent
Wittenberg et al.

(10) Patent No.: US 11,294,976 B1
(45) Date of Patent: Apr. 5, 2022

(54) AD-HOC VENUE ENGAGEMENT SYSTEM

(71) Applicant: Tuple Software LLC, Clyde Hill, WA (US)

(72) Inventors: Craig H. Wittenberg, Clyde Hill, WA (US); Ryan M. Beieler, Bellevue, WA (US)

(73) Assignee: Tuple Software LLC, Clyde Hill, WA (US)

( * ) Notice: Subject to any disclaimer, the term of this patent is extended or adjusted under 35 U.S.C. 154(b) by 376 days.

(21) Appl. No.: 16/504,205

(22) Filed: Jul. 5, 2019

Related U.S. Application Data

(60) Provisional application No. 62/701,836, filed on Jul. 22, 2018.

(51) Int. Cl.
*G06F 16/00* (2019.01)
*G06F 16/9535* (2019.01)
(Continued)

(52) U.S. Cl.
CPC ...... *G06F 16/9535* (2019.01); *G06F 16/9537* (2019.01); *H04L 63/0876* (2013.01); *H04W 4/021* (2013.01)

(58) Field of Classification Search
CPC ........... G06F 16/9535; G06F 16/24578; G06F 16/212; G06F 16/2423; G06F 16/248; G06F 16/951; G06F 15/167; G06F 16/21; G06F 16/2272; G06F 16/24; G06F 16/2477; G06F 16/335; G06F 16/637; G06F 16/639; G06F 21/10; G06Q 30/0201; G06Q 50/01; G06Q 10/063; G06Q 10/067; G06Q 30/0631; G06Q 40/00; G06Q 30/0633; G06Q 10/0637; G06Q 10/10; G06Q 20/321;
(Continued)

(56) References Cited

U.S. PATENT DOCUMENTS 7,840,226 B1 * 11/2010 Walsh .................. H04M 3/436
455/456.1
10,321,284 B1 * 6/2019 France .................. H04W 4/06
(Continued)

*Primary Examiner* — Yicun Wu
(74) *Attorney, Agent, or Firm* — Lowe Graham Jones LLC; Ellen M. Bierman

(57) ABSTRACT

Embodiments described herein provide enhanced computer- and network-based methods, techniques, and systems for incorporating indoor and outdoor location technology to automatically discover, track, and publish ad-hoc engagement opportunities for computer-aided facilitation of dynamic connections between end-users and different levels of engagement in a dynamic venue setting. In one embodiment, the ACES server the ACES server comprises one or more functional components/modules that work together to provide automatic notification of ad-hoc engagement opportunities and/or events and multiple levels of engagement in a dynamic venue setting to client devices currently present in the venue. For example, an ACES server may comprise a client device and location processing engine, a layered identification and security support, a message brokering component, interfaces to third party services and content, an ad-hoc opportunity and event determination, tracking, and notification engine, a dynamic interest and attribute matching rule engine, and a common user interface engine.

19 Claims, 10 Drawing Sheets
(5 of 10 Drawing Sheet(s) Filed in Color)

(51) Int. Cl.
*H04L 29/06* (2006.01)
*G06F 16/9537* (2019.01)
*H04W 4/021* (2018.01)

(58) Field of Classification Search
CPC ............ G06Q 20/3224; G06Q 20/326; G06Q 20/384; G06Q 30/0203; G06Q 30/0204; G06Q 30/0222; G06Q 30/0255; G06Q 30/0261; G06Q 30/0267; G06Q 30/0282; G06Q 30/0623; G06Q 30/08; G06Q 50/184
See application file for complete search history.

(56) References Cited

U.S. PATENT DOCUMENTS

| | | | |
|---|---|---|---|
| 2009/0055899 A1* | 2/2009 | Deshpande | H04L 65/80 726/4 |
| 2011/0098056 A1* | 4/2011 | Rhoads | G06T 19/006 455/456.1 |
| 2013/0150117 A1* | 6/2013 | Rodriguez | G06K 9/00006 455/550.1 |
| 2014/0280748 A1* | 9/2014 | Hinckley | H04L 69/16 709/219 |
| 2016/0057594 A1* | 2/2016 | Nebel | H04W 4/02 455/456.3 |
| 2018/0007524 A1* | 1/2018 | Tian | G06Q 50/01 |
| 2018/0027070 A1* | 1/2018 | Jhanji | H04W 4/08 709/217 |
| 2021/0049710 A1* | 2/2021 | Haywood | G06Q 50/01 |

* cited by examiner

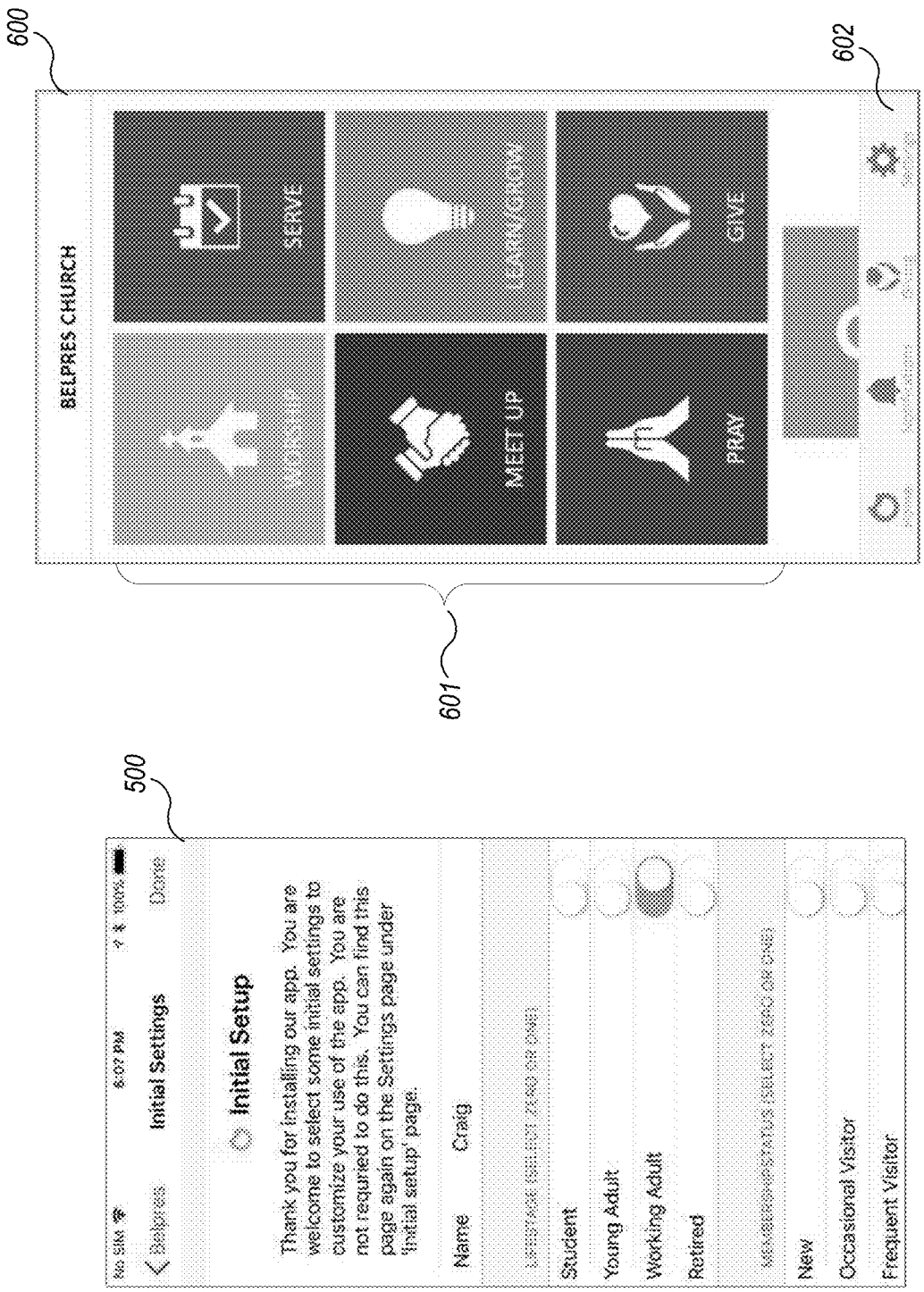
*Fig. 6* Home Page
*Fig. 5* First Launch Screen

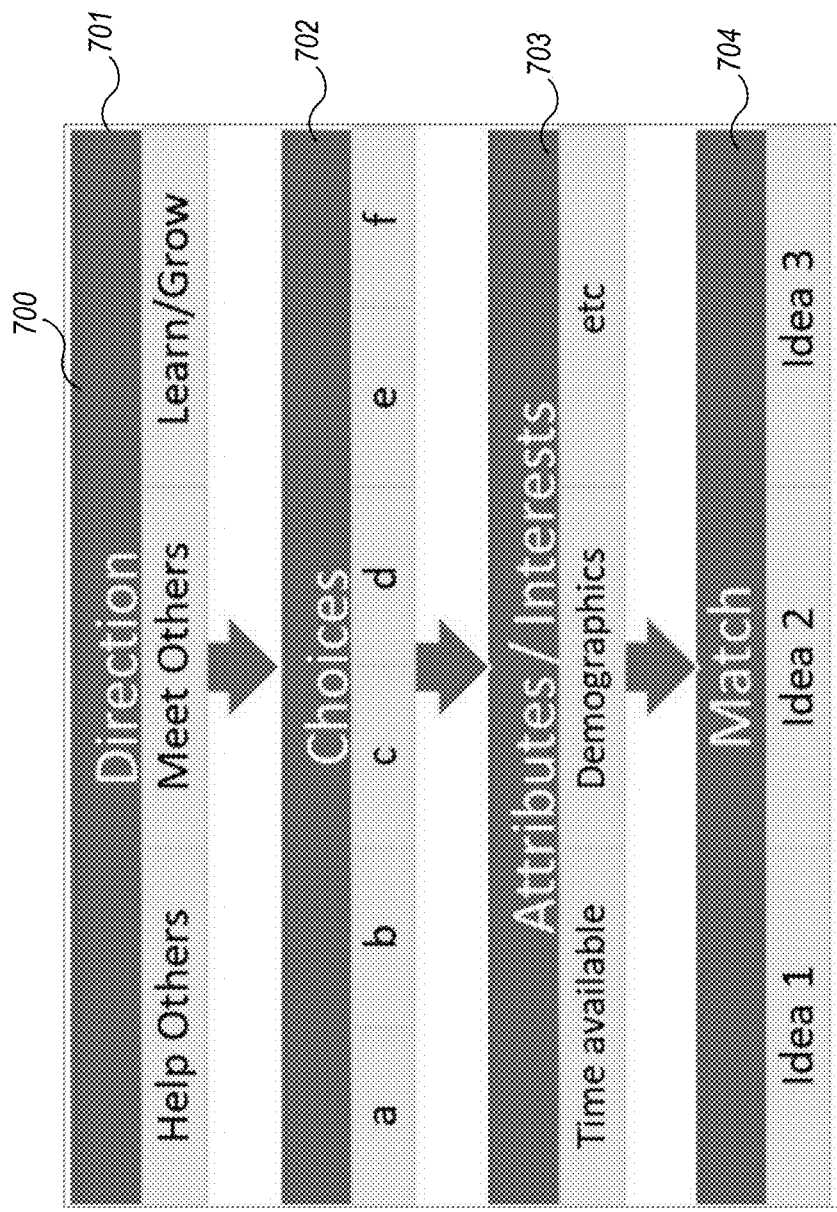
*Fig. 7* Common User Interface Scheme

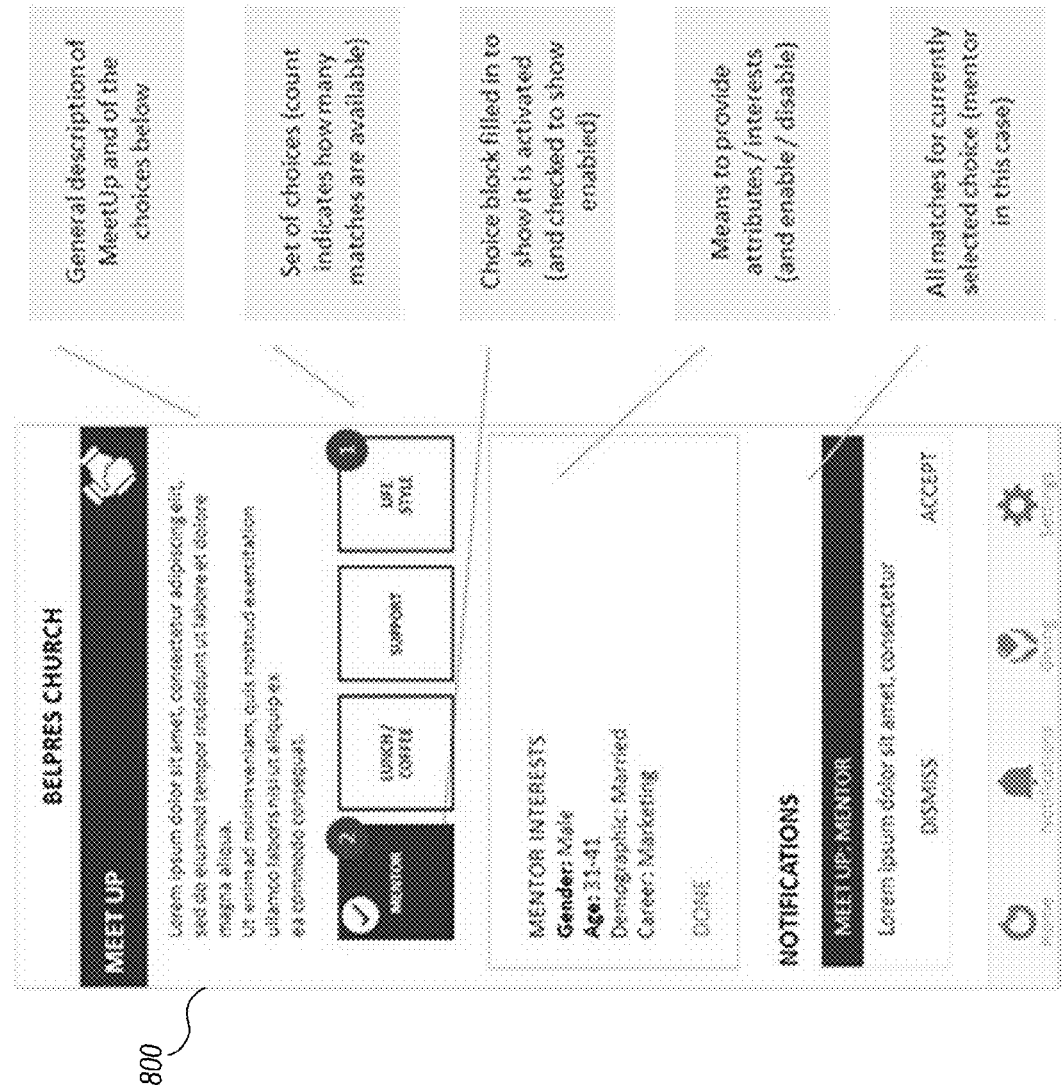
*Fig. 8* MeetUp Link Tile Visual Layout

| Choice | Purpose | Attributes/interests | Matches |
|---|---|---|---|
| At Church | To connect users with needs at church | Availability and personality attributes | See below |
| In Our Community | To connect users with community needs | Availability and personality attributes | See below |
| Church Family | To connect users with needs of our church family | See below | See below |
| Global | To highlight interesting national and global needs | See below | See below |
| Urgent | Special section of urgent needs (might also appear above) | Skills/interests | See below |

901 — At Church
902 — In Our Community
903 — Church Family
904 — Global
905 — Urgent

*Fig. 9* Serve Tile Opportunities

| | |
|---|---|
| E Extroverts are energized by people, enjoy a variety of tasks, a quick pace, and are good at multitasking. | S Sensors are realistic people who like to focus on the facts and details, and apply common sense and past experience to come up with practical solutions to problems. |
| I Introverts often like working alone or in small groups, prefer a more deliberate pace and like to focus on one task at a time. | N Intuitives prefer to focus on possibilities and the big picture, easily see patterns, value innovation, and seek creative solutions to problems. |
| T Thinkers tend to make decisions using locgical analysis, objectively weigh pros and cons, and value honesty, consistency, and fairness. | J Judgers tend to be organized and prepared, like to make and stick to plans, and are comfortable following most rules. |
| F Feelers tend to be sensitive and cooperative, and decide based on their own personal values and how others will be affected by their actions. | P Perceivers prefer to keep their options open, like to be able to act spontaneously, and like to be flexible with making plans. |

*Fig. 10* Personality Types Key

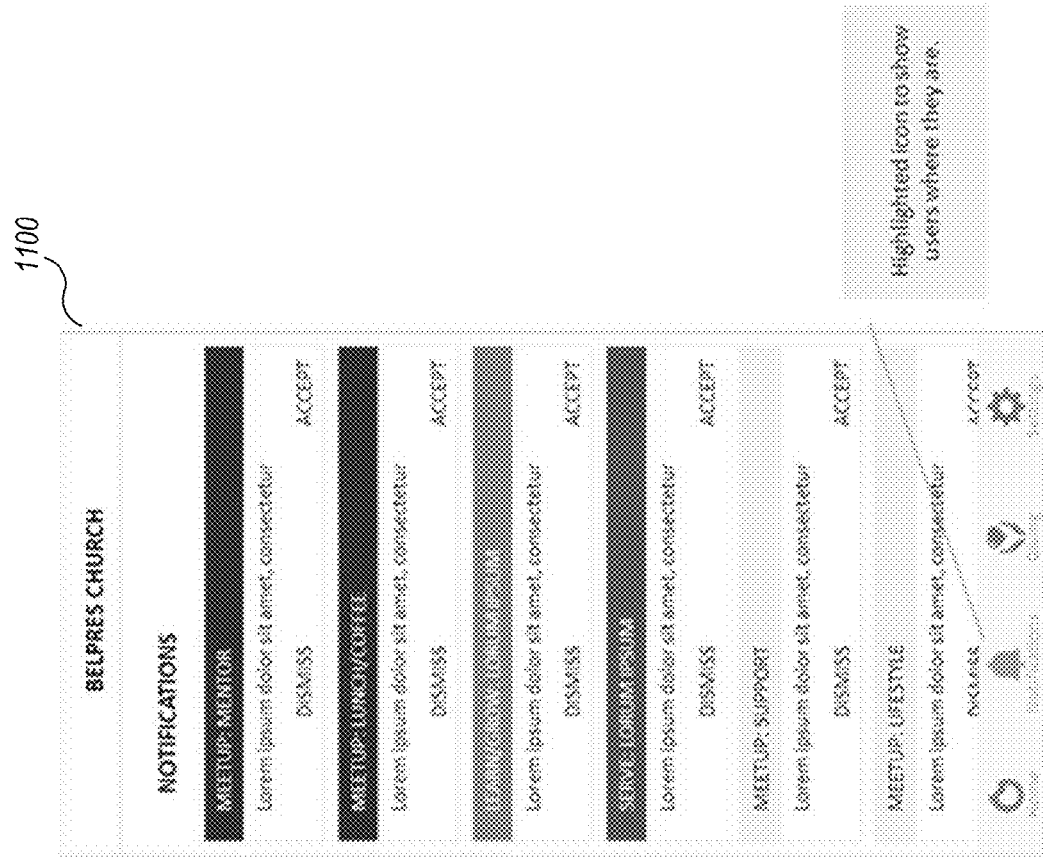
Fig. 11 Notification Screen

AD-HOC VENUE ENGAGEMENT SYSTEM

CROSS-REFERENCE TO RELATED APPLICATION

This application claims the benefit of U.S. Provisional Patent Application No. 62/701,836, entitled "AD-HOC VENUE ENGAGEMENT SYSTEM," filed Jul. 22, 2018, which application is incorporated herein by reference in its entirety.

TECHNICAL FIELD

The present disclosure relates to methods, techniques, and systems for using electronic systems to improve physical community engagement and, in particular, to methods, techniques, and systems for incorporating indoor and outdoor location technology to automatically discover, track, and publish ad-hoc opportunities for computer-aided facilitation of different levels of engagement in a dynamic venue setting.

BACKGROUND

Technology and information are rampant in today's environment. However, the ability to identify opportunities where people can physically engage with others based upon mutual interests such as to find service opportunities are sometimes difficult to identify—especially in venues which undergo continuous change or fluctuate and where the people do not already have knowledge of each other. Specific applications have been developed to help people engage with others via an online presence (for example, social networking sites, dating applications, messaging applications), but often can do little for the individuals in a physical setting unless each knows the other person is present or is somehow connected to them. Location aware "meetup" type applications have been developed for use for example by friends to find each other; however these applications are sometimes avoided due to privacy concerns and again the people must already be connected in some way. Dating applications are available for matching people who share common attributes or desire meeting people with particular attributes. However, none of these applications are tied or related to characteristics of a physical venue.

BRIEF DESCRIPTION OF THE DRAWINGS

The patent or application file contains at least one drawing executed in color. Copies of this patent or patent application publication with color drawings will be provided by the Office upon request and payment of any necessary fee.

FIG. 5 is an example of an initial screen of an example Link App application.

FIG. 6 is an example Home Page screen of an example Link App application.

FIG. 7 is an example flow of a common user interface scheme.

FIG. 8 is an example visual layout for the MeetUp link tile of an example Link App application.

FIG. 9 shows server opportunities of an example Link App application.

FIG. 10 is an example personality types index for determining a category of personality type in an example Link App application.

FIG. 11 is an example display of a notification screen for an example Link App application.

DETAILED DESCRIPTION

Figure 1:
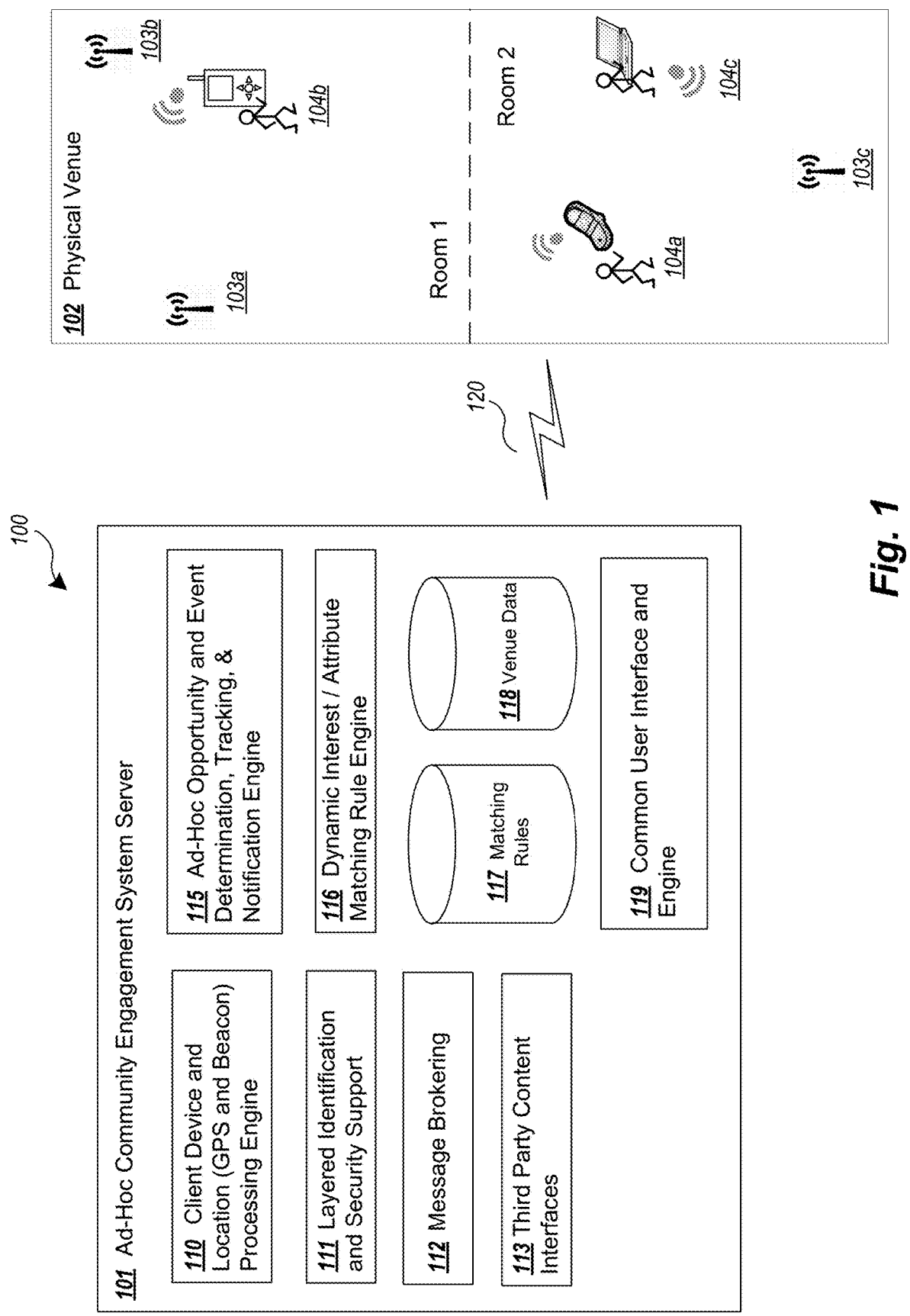
FIG. 1 is an example block diagram of an overview of an example Ad-Hoc Community Engagement System in use in a physical venue.

Embodiments described herein provide enhanced computer- and network-based methods, techniques, and systems for incorporating indoor and outdoor location technology to automatically discover, track, and publish ad-hoc engagement opportunities for computer-aided facilitation of dynamic connections between end-users and different levels of engagement in a dynamic venue setting. For the purposes herein, a venue means a physical location (building, facility, arena, field, playground, real world location, etc.) or any bounded physical (not virtual) indoor or outdoor space in the real world.

Example embodiments provide an Ad-Hoc Community Engagement System ("ACES"), which enables end-users to facilitate different levels of engagement with other users and with events and opportunities that are based upon a current state of a physical venue. The current state of the physical venues includes who (what other users) are currently present in the space as well as potentially other attributes associated with the space such as the time of day, current time or day, weather, season, what events are currently underway, what events/opportunities are available in the future, and the like. The Ad-Hoc Community Engagement System determines, on some time-associated basis (such as at designated times, intervals, or frequencies, determined conditions precedent, repeatedly, occasionally, and the like) the current state of the physical venue and calculates, for each user that is running the ACES client application (or opted into notification), a current set of opportunities and/or events that best match the user's needs and interests. In at least one example ACES, a best match is determined not only on the current state of the venue, but also based upon matching the user's personality type based upon answers to a series of questions and attribute values specified by other means. Notifications can be automatically pushed to the user's mobile device if the user has opted into receiving them.

ACES goes beyond social media or meetup applications in that it provides the ability for users who do not even know each other exist or who are new to the venue to connect in an "ad-hoc" nature based upon current needs and interests associated with the current state of a physical venue. Thus, for example, in a health club, a visitor to the venue can easily figure out whether there are classes currently going on that have seniors participating in them. Or, as another example, a visitor, new member, or long time member of a venue can learn about impromptu discussions or opportunities, find a particular location, receive notifications of opportunities to help others in some endeavor or with some need, and the like. Or, for example, current and future activities such as hiking groups, barbeque events, meetings, etc., may be formed in an ad-hoc or planned manner based upon those connected to the venue and current needs and interests associated with the current state of the venue.

Notifications of opportunities and/or events are triggered using indoor and outdoor location information simply by a user who has installed (and is running) the ACES client application entering the venue with a mobile device having Internet connectivity with Bluetooth enabled and location access permitted. For example, in some example ACES environments, the indoor and outdoor location information incorporates data from low energy (e.g., Bluetooth) beacons and Global Positioning System ("GPS") signals. No login or account information is required; no setup is required; and no personally identifiable information ("PII") is required from the user. In some embodiments, an ACES backend (server computing system) determines what mobile devices are present based upon what beacons located in the venue are recognized by the device and the GPS coordinates of the device. No tracking of the mobile devices in the facility is needed. Accordingly, ACES provides an easy and safe way for people who do not know each other to connect and engage in things happening in a physical venue—whether that venue is indoors or outdoors. In some scenarios beacons and GPS techniques are employed; in others only one or the other is employed. For example, in some physical locations (e.g., outdoors) beacons may not be available and a subset of techniques used to determine who is present. In addition, client side use of ACES may work in certain countries and environments where PII use is curtailed or otherwise limited. ACES also provides a layered identification mechanism. Initial installation/download of an ACES client (e.g., ACES application) unlocks initial capabilities based upon a globally unique identifier ("GUID") created at that time. Additional capabilities are unlocked upon providing some initial attributes (e.g., topics of interest), a phone number, and then again more can be unlocked based upon an account associated with a venue.

In addition, ACES provides a common user interface scheme that can be used in multiple, distinct venues. The common user interface enables content provides to simplify provisioning of information for a venue and allows ACES users a quick-to-learn technique for indicating specific kinds or types of opportunities or events that they interested engaging in.

The ACES backend (server) environment handles storing information and content related to the venue, managing the current state of the venue (e.g., including determining active user devices), brokering messages (both pushed notifications and bidirectional communication, dynamic interest and need matching to available opportunities and/or events (current opportunity/event matching), layered identification, security services, access to third party content, and automatic notification of current available matched opportunities and/or events to active user devices. Backend services supported by the ACES backend may be implemented using a variety of (cloud-based) computing platforms as well as by on-location computing system. Services that may be supported include, for example:

Access to current venue information, which relieves the venue community from supporting direct application access in all cases. Information can be loaded from the venue or directly uploaded to ACES backend by a venue content provider.

Managing active devices when the devices are at the venue or when GPS-based functionality is desired.

Brokering messages between members that are triggered as part of the ACES interface.

Matching interests or needs with offers to help resulting in messages sent to the relevant people.

Facilitating phone number registration.

Security services to support anonymous use cases and to protect against cyber attacks.

In some embodiments, a reporting facilities for giving usage information to the venue are supported. Additionally, authoring tools or other facilities for streamlining content provision and/or integration may also be provided.

FIG. 1 is an example block diagram of an overview of components of an example Ad-Hoc Community Engagement System in use in a physical venue. An Ad-Hoc Community Engagement System comprises a server side 101 that communicates over one or more communications links 120 with one or more beacons 103a-c and one or more user (client) devices 104a-c running a client application or code logic (not shown) currently present in a physical venue 102. As shown, several beacons 103a-c are placed in different locations in the venue 102. When a user device detects that it is in the vicinity of a particular beacon, the client code running on the user device notifies the ACES server 101 of its presence and location. For example, when user device 104b detects that it is in the vicinity (within range) of beacon 103b, the ACES server (or backend system) 101 updates its management of state of the venue and determines at some point in time which opportunities and/or events are potentially relevant or desired by the corresponding user of the device 104b. In one example ACES environment, the user devices 104a-c are mobile devices that can communicate wirelessly over a Bluetooth or WiFi connection. Some example ACES environments also support wired connections to user devices. The layered identification capability of ACES contemplates that each user device 104a-c is at least WiFi and Bluetooth enabled so that the beacons 103a-c are detectable and so that the backend 101 can communicate via a network such as the Internet with the user devices 104a-c. As shown in FIG. 1, physical venue 102 may be further subdivided into different areas such as rooms 1 and 2.

Beacons 103a-c may be any type of small electronic device which emits blips or beeps according to Bluetooth Advertising specifications (or other low energy wireless protocol). For example, iBeacons from APPLE Corp., AltBeacon from RADIUS NETWORKS, or Eddystone from GOOGLE may be employed for this purpose.

In one example embodiment, the ACES server 101 comprises one or more functional components/modules that work together to provide automatic notification of ad-hoc engagement opportunities and/or events in a dynamic venue setting. For example, an Ad-Hoc Community Engagement System server 101 may comprise a client device and location processing engine 110, a layered identification and security support 111, a message brokering component 112, interfaces to third party services and content 113, an ad-hoc opportunity and event determination, tracking, and notification engine 115, a dynamic interest and attribute matching rule engine 116, and a common user interface and engine 119.

The client device and location processing engine 110 is responsible for using indoor and outdoor location technologies (e.g., geo-fencing) such as Bluetooth beacons and/or GPS signals to determine the current state of the physical venue 102 including what user devices are present and where. To be detected, the user device needs to be running (at least in the background) the ACES client code and have location access permissions enabled. If the user wishes as well to be notified upon entry to and/or exit from the venue 102, then the user also gives the ACES client code notification permission. client device and location processing engine 110 can use GPS location information to trigger messages to (known) members and as a cross-check to prevent beacon spoofing. That is a signal from a beacon can be discarded when the GPS location of the user device does not match the GPS location of the (known location) of the beacon in the venue. Other spoofing prevention techniques can be employed such as a mechanism called Ephemeral Identifiers supported by the Eddystone protocol. Since the current state of the physical venue 102 is relevant to auto-notification of engagement opportunities and/or events, this current state may be tracking by the client device and location processing engine 110 at specified or calculated intervals, frequencies, times, conditions, and the like.

In some instances, the client device and location processing engine 110 can also facilitate connections between two or more ACES users when they are both present in a remote location (not their home venue or location) based upon appropriate permissions. Compass functionality of a mobile device can be used to further enhance these experiences for example by using the compass to improve directions to a meeting spot.

The layered identification and security support 111 is responsible for determining, when a user device is detected in a particular location in venue 102, what particular functions are available to the user of the user device. For example, initial functionality of ACES is available simply by downloading/installing the ACES client code on a compatible user device with location permission, Bluetooth and WiFi enabled and visiting the venue 102. The basic functions of the ACES environment do not require an ACES participant to provide any personal information, a login, or to set up an account. Each installation of the ACES application/code is known only by a unique number (GUID) created at the time the application/code is installed.

Demographic and other information can be provided to customize the user experience. The layered identification and security support 111 can use such (optional) information to help determine what level of notifications and to set criteria used by they dynamic interest/attribute matching rule engine 116. Such optional information may include gender, age/life stage, children and their ages, home location, events normally attended, and the like. The information provided may be general such as "single" or more specific "married, mid-60s, grown kids, active lifestyle, wants to meet other couples, lives in Bellevue". Each profile is customized for and appropriate to the venue (for example a sports/fitness focus may be relevant for a health club but not necessarily at a worship venue).

The layered identification and security support 111 also determines whether a user has provided a phone number to unlock a next level of ACES capabilities. The phone number can be verified by having the user send a text message to the ACES backend 101 with a unique code in the message (which uniquely identifies the phone, but is not the International Mobile Equipment Identify ("IMEI") or other persistent identifier). The unique code is automatically entered by the ACES client code in the text prior to it being sent.

The layered identification and security support 111 also determines whether a user has created an account for the venue (or across multiple ACES environments). If so, access can be granted to venue or community specific information which requires the account (e.g., a membership directory) and to simplify some functions (for example, charitable contributions, saved event registration information, pledges, etc.).

The common user interface and engine 119 provides a scheme for content that can be used by multiple venues and communities in a similar fashion. This allows core ACES features to be customized and targeted to a specific venue/community without requiring lots of programming. Further it allows participants in multiple venues to download one application that operates across venues. This provides a common user experience even though the venues may be vastly different. In one example ACES environment, the common user interface consists of four layers: categories of opportunities and/or events, choices within categories, attributes or interests within a choice, and matching opportunities and/or events with an attribute or interest. Matching rules 117 and the rule engine 116 is invoked to present the matching opportunities and/or events level.

The ad-hoc opportunity and event determination, tracking, and notification engine 115 is responsible for determining on-the-fly (dynamically and when needed or desired), i.e., ad-hoc, the opportunities and/or events that are relevant, appropriate, and/or available for each active device user who constitutes part of the current venue. This engine uses the information about the current state of the venue from the client device and location processing engine 110 and, based upon permissible actions determined by the layered identification and security support 111 and using the matching rule engine 116, matches each user's interests, attributes, and other criteria to opportunities and/or events presently supported by the venue.

The dynamic interest and attribute matching rule engine 116 is responsible for matching each active device user to available opportunities and/or events and supplies this information to the ad-hoc opportunity and event determination, tracking, and notification engine 115 to determine ad-hoc opportunities and/or events. The matching rule engine uses defined and stored matching rules from matching rule repository 117 and venue data from venue data repository 118 to general a set of possible ad-hoc opportunities and/or events. These possible ad-hoc opportunities and/or events may then be sorted, ranked, and/or filtered by lots of known means. Example logic for matching using matching rules repository 117 and venue data repository 118 is described further below with respect to FIG. 3. Other and additional forms of matching users to opportunities and/or events on an ad-hoc basis may be similarly incorporated. For example, one or more machine learning systems may be incorporated that use known algorithms (e.g. Bayes, linear regression, SVMs, etc.) to determine what opportunities and/or events best match a particular user.

The message brokering component 112 is responsible for interacting with third party or other texting (e.g., SMS), messaging, chat, or email systems or applications to send communications back and forth to and from other users.

The interfaces to third party services and content 114 is responsible for interfacing with other third party applications and/or content such as a note taking application, the website or other applications native to or used by the venue, etc.

The techniques of ad-hoc opportunity and/or event determination and the Ad-Hoc Community Engagement System are generally applicable to any type of physical venue, including religious or spiritual buildings, facilities, or venues, sports or athletic facilities, buildings for education, work, recreation (or any purpose), and/or any real-world venue, indoor or outdoor, that can be demarcated with physical or virtual boundaries using low-energy beacon or equivalent technology and GPS location information. For example, new events and opportunities related to a venue (such as a community building) may be formed depending upon who is present, their characteristics and their interests. Also, although certain terms are used primarily herein, other terms could be used interchangeably to yield equivalent embodiments and examples. In addition, terms may have alternate spellings which may or may not be explicitly mentioned, and all such variations of terms are intended to be included.

Example embodiments described herein provide applications, tools, data structures and other support to implement a Ad-Hoc Community Engagement System to be used to automatically discover, track, and publish ad-hoc engagement opportunities for computer-aided facilitation of dynamic connections between end-users and different levels of engagement in a dynamic venue setting. Other embodiments of the described techniques may be used for other purposes. In the following description, numerous specific details are set forth, such as data formats and code sequences, etc., in order to provide a thorough understanding of the described techniques. The embodiments described also can be practiced without some of the specific details described herein, or with other specific details, such as changes with respect to the ordering of the logic, different logic, etc. Thus, the scope of the techniques and/or functions described are not limited by the particular order, selection, or decomposition of aspects described with reference to any particular routine, module, component, and the like.

Figure 2:
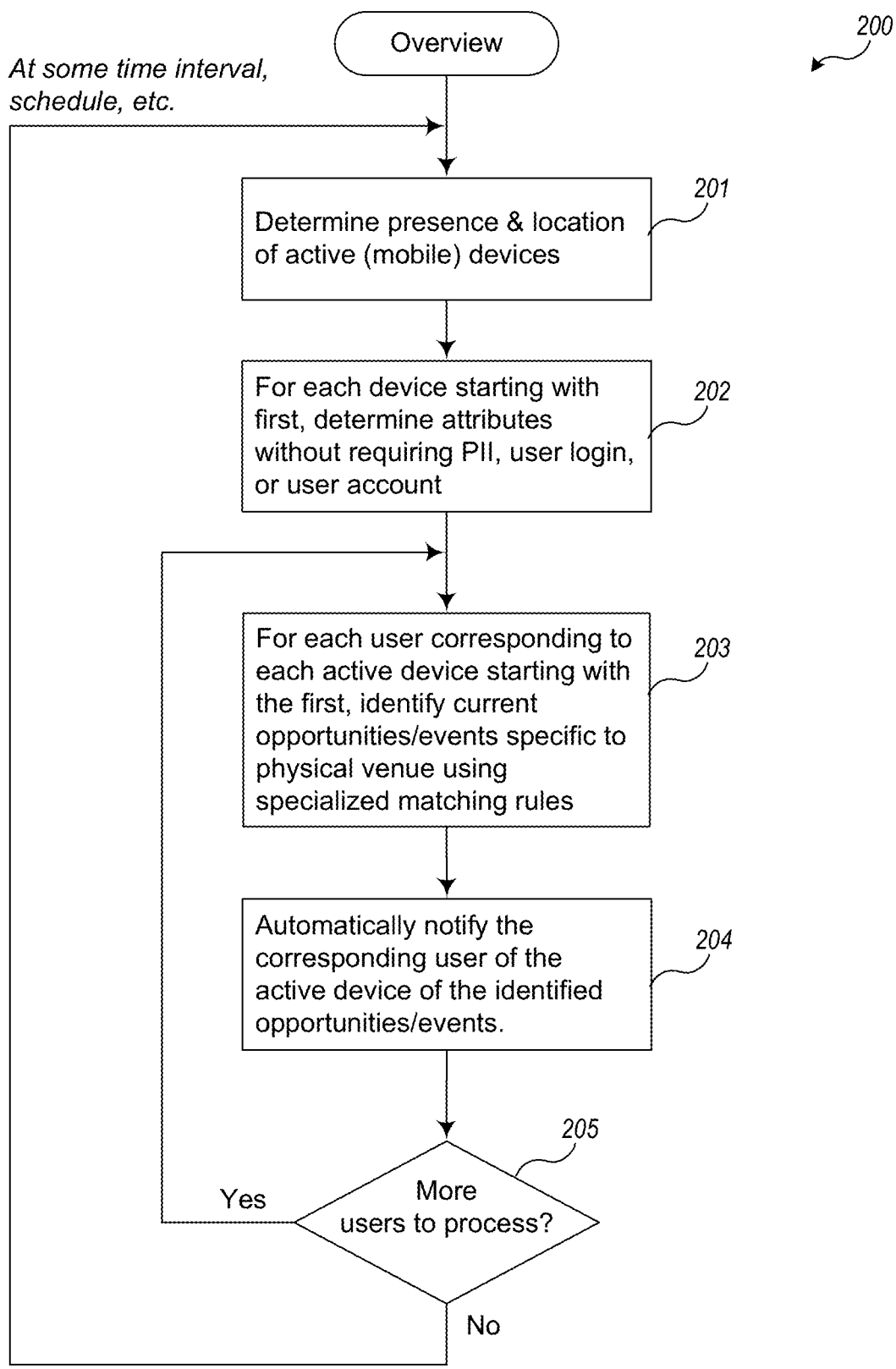
FIG. 2 is an example flow diagram of an example process for automatically providing notification of ad-hoc opportunities and/or events in a physical venue using an example Ad-Hoc Community Engagement System.

FIG. 2 is an example flow diagram of an example process for automatically providing notification of ad-hoc opportunities and/or events in a physical venue using an example Ad-Hoc Community Engagement System. This code logic is performed by an ACES server, for example, the ACES Server 101 of FIG. 1. According to some time interval, schedule, season, or other calculation, the logic of FIG. 2 is performed continuously or at regular intervals.

In block 201, the ACES server determines the presence and location of the active devices in the venue (e.g., venue 102 of FIG. 1) using GPS location for a "gross" measurement of latitude/longitude and using Bluetooth low-energy beacon technology to determine when a device is in range of a particular beacon to establish where the device is currently within the venue. As explained above, certain techniques may be employed to detect and ignore spoofed beacons.

Then, in block 202, for each user of each detected device, particular attributes are determined without requiring PII, a user login, or a user/venue/ACES account. These attributes may be established at various times, such as when the ACES application is first downloaded, or at other times in various ways including by answers to specific questions, optional information indicated by the user, values stored in the device by the user (with appropriate permissions given), and the like. For example, the user's age, children, education, background, work experience, life goals, charitable preferences, and the like provide useful information for matching purposes. As explained with respect to FIG. 3, values of these attributes are matched with availability information and potentially personality characteristics to dynamically determine matching opportunities and/or events.

Blocks 203 through 204 describe a loop for determining matching opportunities and events and automatically notifying the corresponding user of each active device. Specifically, in block 203, the ACES server matches the opportunities and/or events currently available in the venue to the interests, attributes, availability, and/or other characteristics of the corresponding user. For example, in a church venue, the opportunities and/or events may include learning about impromptu discussions or opportunities to meet new people, finding the church office (with directions based on approximate location using beacons), obtain help with the ACES client application (which triggers requests for ACES application assistance in the ACES client application of other users currently at church who are willing to help), register and get notified of friends/family already present, submit or respond to prayer requests (some of which may be private and thus only available to pastors or other authorized persons), get notification that one's child is having trouble in childcare, and the like.

Finding matching opportunities and/or events may be performed, for example, as described with reference to FIG. 3. In block 204, the ACES server automatically notifies the corresponding user of the determined matching opportunities and/or events. The ACES server may use proprietary or third party methods for providing notification, such as by pushing notifications through the ACES client application interfaces, displaying the matching opportunities and/or events responsive to the corresponding user's request or search, sending and/or brokering messages, and the like. For example, messaging protocols such as GOOGLE Firebase Cloud Messaging and SignalR bi-directional messaging may be incorporated, as well as use of SMS (text) messaging, email, and similar protocols.

Figure 3:
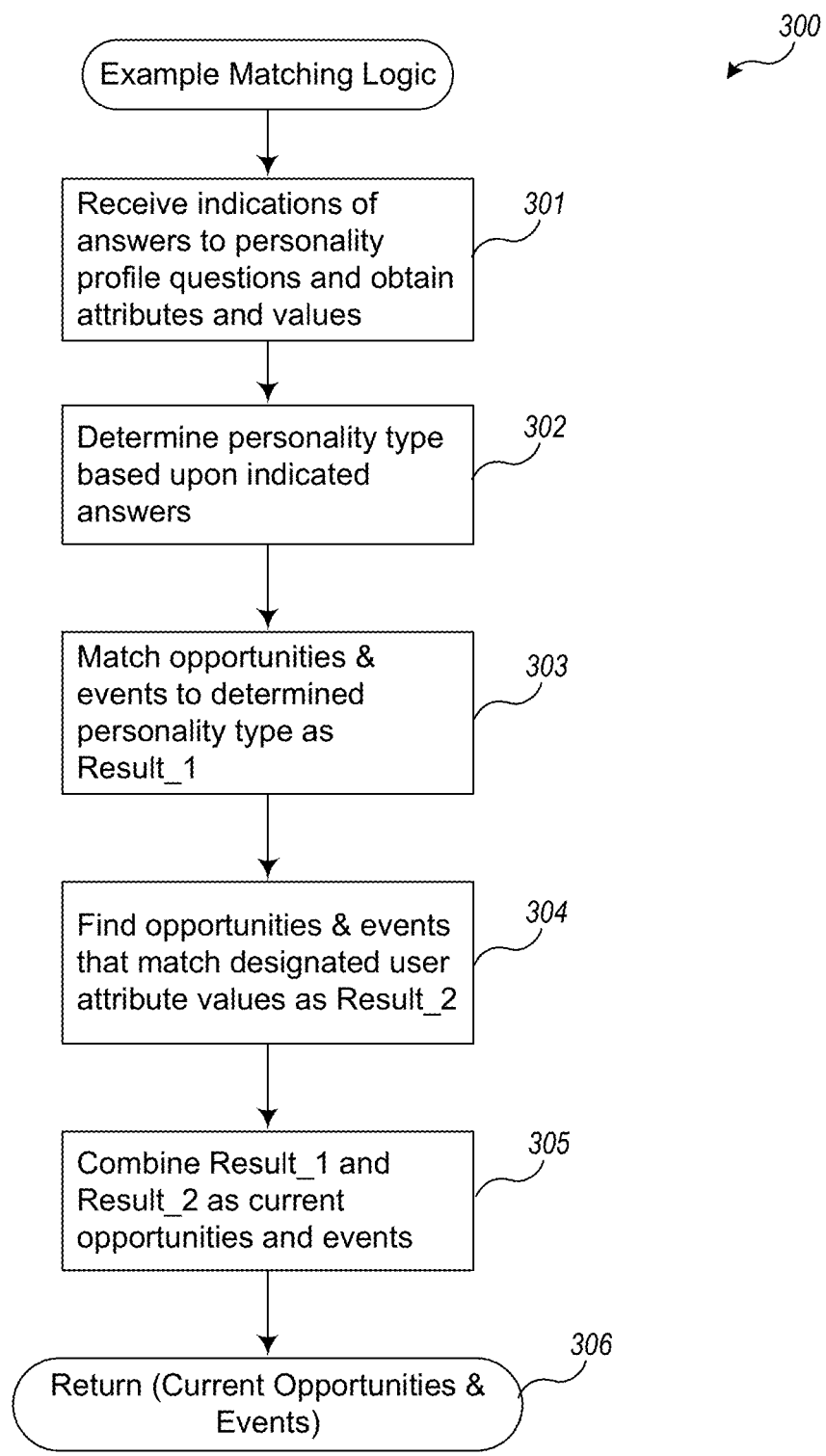
FIG. 3 is an example flow diagram of attribute matching performed by an example embodiment of an Ad-Hoc Community Engagement System.

FIG. 3 is an example flow diagram of attribute matching performed by an example embodiment of an Ad-Hoc Community Engagement System. This code logic is performed by an ACES server, for example, the ACES Server 101 of FIG. 1, whenever ad-hoc determination of matching opportunities and/or events is desired (for example, during block 203 of FIG. 2.)

In block 301, the ACES server receives indications of answers to personality profile questions and determines values of the (current) user's attributes (including availability as relevant). (Recall that the matching logic is invoked for each corresponding user of each active device, or as needed on a per-user basis.) The attribute values and/or answers to personality profile questions may have been, in whole or in part, previously determined, determined concurrently, or both. For example, the server may ask additional questions of the user through an input screen of the ACES client code.

In block 302, the answers to the personality profile questions are used to determine a personality type category, such as those of a modified Myers-Briggs Personality Type scheme.

In block 303, the server matches the current user's personality type category to opportunities and/or events available in the venue using some kind of rules engine, table driven, or the like to determine which opportunities and/or events correspond to (at least theoretically) or are best suited to which personality types. One such mapping that can be used to drive a rules matching engine is shown in Appendix A, which describes example mapping for an embodiment of ACES (called "Link App").

In block 304, the server matches other received attribute values of the current user, potentially including the user's availability, to opportunities and/or events available in the venue that correspond. This can be performed for example by string matching or other such algorithms to determine whether the attribute values are sufficiently similar (or identical) to the available opportunities and/or events.

In block 305, the server combines the results of blocks 303 and 304 to determine the relevant, available, and corresponding current venue opportunities and/or events and returns these in block 306. Combining the results of blocks 303 and 304 may involve additional processing such as filtering the results (for example to eliminate duplicates or a list of blocked opportunities and/or events), sorting the results (for example by time or category), or ranking the results by a user-selectable or server designated order. Other post-processing may be similarly incorporated. Any other mapping or engine that maps a current user to available opportunities and/or events may be similarly incorporated.

Figure 4:
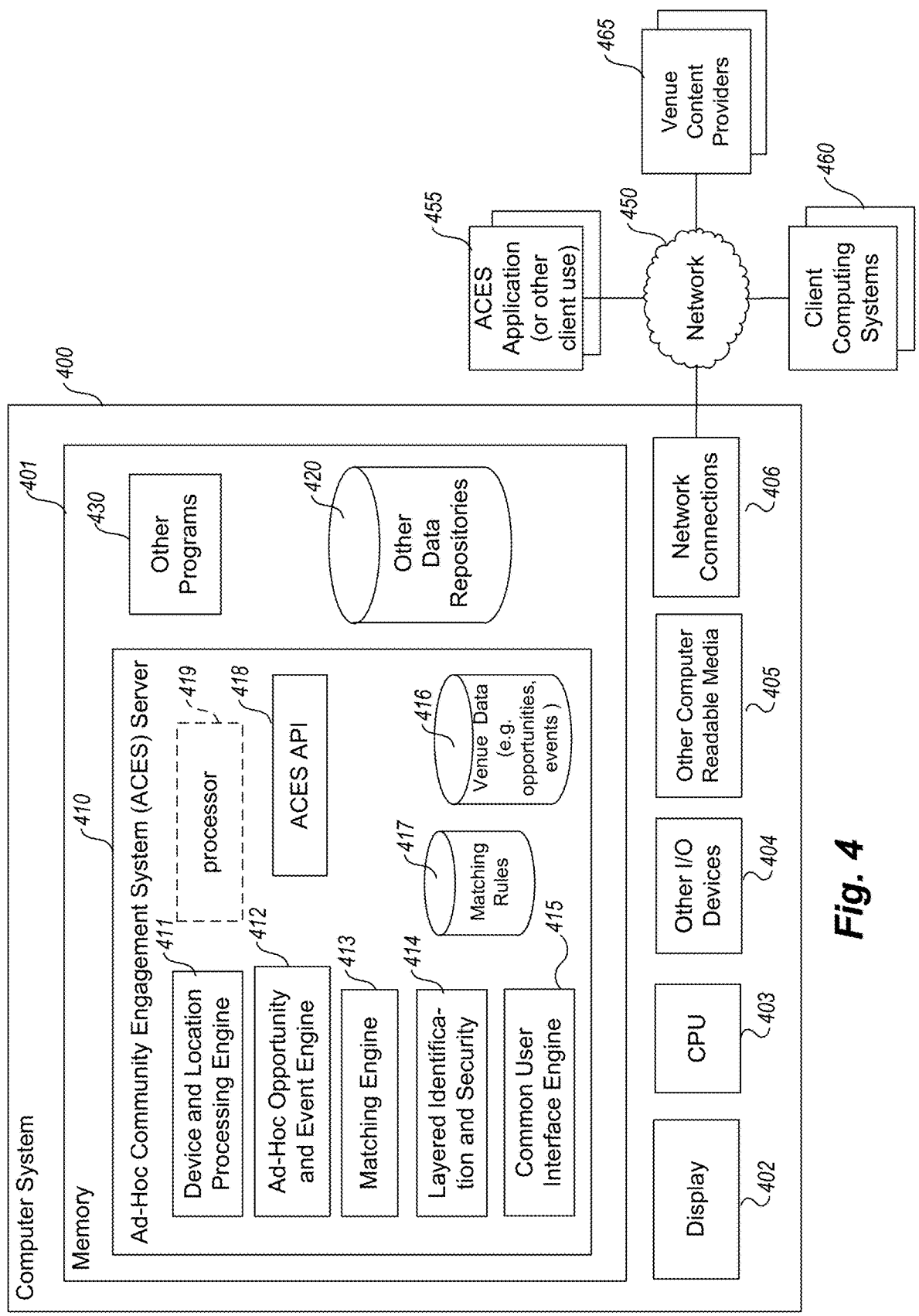
FIG. 4 is an example block diagram of an example computing system for implementing an example Ad-Hoc Community Engagement System according to an example embodiment.

FIG. 4 is an example block diagram of an example computing system that may be used to practice an example Ad-Hoc Community Engagement System described herein. Note that one or more general purpose virtual or physical computing systems suitably instructed or a special purpose computing system may be used to implement an ACES. Further, the ACES may be implemented in software, hardware, firmware, or in some combination to achieve the capabilities described herein.

Note that one or more general purpose or special purpose computing systems/devices may be used to implement the described techniques. However, just because it is possible to implement the ACES on a general purpose computing system does not mean that the techniques themselves or the operations required to implement the techniques are conventional or well known.

The computing system 400 may comprise one or more server and/or client computing systems and may span distributed locations. In addition, each block shown may represent one or more such blocks as appropriate to a specific embodiment or may be combined with other blocks. Moreover, the various blocks of the Ad-Hoc Community Engagement System 410 may physically reside on one or more machines, which use standard (e.g., TCP/IP) or proprietary interprocess communication mechanisms to communicate with each other. In addition, computing system 400 may comprised components stored in a cloud computing environment and supported by platforms such as AZURE or AWS.

In the embodiment shown, computer system 400 comprises a computer memory ("memory") 401, a display 402, one or more Central Processing Units ("CPU") 403, Input/Output devices 404 (e.g., keyboard, mouse, CRT or LCD display, etc.), other computer-readable media 405, and one or more network connections 406. The ACES 410 is shown residing in memory 401. In other embodiments, some portion of the contents, some of, or all of the components of the ACES 410 may be stored on and/or transmitted over the other computer-readable media 405. The components of the Ad-Hoc Community Engagement System 410 preferably execute on one or more CPUs 403 and manage the automatic notification of ad-hoc determined venue opportunities and/or events as described herein. Other code or programs 430 and potentially other data repositories, such as data repository 420, also reside in the memory 401, and preferably execute on one or more CPUs 403. Of note, one or more of the components in FIG. 4 may not be present in any specific implementation. For example, some embodiments embedded in other software may not provide means for user input or display.

In a typical embodiment, the ACES server 410 includes one or more device and location processing engines 411, one or more ad-hoc opportunity and/or event engines 412, one or more matching engines 413, one or more layered identification and security components, a common user interface engine 415, matching rules data repository 417 and venue data repository 416, as explained above with reference to FIGS. 1-3. In at least some embodiments, the rules/matching engine 413 is provided external to the ACES server and is available, potentially, over one or more networks 450. In addition, the rules/matching engine 413 may be comprised of one or more machine learning systems (e.g., processor 419) that use known algorithms (e.g. Bayes, linear regression, SVMs, etc.) to determine what opportunities and/or events best match a particular user. Other and/or different modules may be implemented.

In addition, the ACES server interacts via a network 450 with application or client code 455 to notify users of potential opportunities and/or events or to facilitate other levels of engagement, one or more client computing systems 460, and/or one or more third-party information provider systems 465, such the computing systems that host venue content information. Also, of note, the data repositories 416 and 417 may be provided external to the ACES server as well, for example in a knowledge base accessible over one or more networks 450.

In an example embodiment, components/modules of the ACES server 410 are implemented using standard programming techniques. For example, the ACES server 410 may be implemented as a "native" executable running on the CPU 103, along with one or more static or dynamic libraries. In other embodiments, the ACES server 410 may be implemented as instructions processed by a virtual machine. A range of programming languages known in the art may be employed for implementing such example embodiments, including representative implementations of various programming language paradigms, including but not limited to, object-oriented, functional, procedural, scripting, and declarative.

The embodiments described above may also use well-known or proprietary, synchronous or asynchronous client-server computing techniques. Also, the various components may be implemented using more monolithic programming techniques, for example, as an executable running on a single CPU computer system, or alternatively decomposed using a variety of structuring techniques known in the art, including but not limited to, multiprogramming, multi-threading, client-server, or peer-to-peer, running on one or more computer systems each having one or more CPUs. Some embodiments may execute concurrently and asynchronously and communicate using message passing techniques. Equivalent synchronous embodiments are also supported.

In addition, programming interfaces to the data stored as part of the ACES server 410 (e.g., in the data repositories 416 and 417) can be available by standard mechanisms such as through C, C++, C#, and JAVA APIs (ACES API 418); libraries for accessing files, databases, or other data repositories; through scripting languages such as XML; or through Web servers, FTP servers, or other types of servers providing access to stored data. Data repositories 416 and 417 may be implemented as one or more database systems, file systems, or any other technique for storing such information, or any combination of the above, including implementations using distributed computing techniques.

Also the example ACES server 410 may be implemented in a distributed environment comprising multiple, even heterogeneous, computer systems and networks. Different configurations and locations of programs and data are contemplated for use with techniques of described herein. In addition, the [server and/or client] may be physical or virtual computing systems and may reside on the same physical system. Also, one or more of the modules may themselves be distributed, pooled or otherwise grouped, such as for load balancing, reliability or security reasons. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, etc.) and the like. Other variations are possible. Also, other functionality could be provided by each component/module, or existing functionality could be distributed amongst the components/modules in different ways, yet still achieve the functions of an ACES server.

Furthermore, in some embodiments, some or all of the components of the ACES server 410 may be implemented or provided in other manners, such as at least partially in firmware and/or hardware, including, but not limited to one or more application-specific integrated circuits (ASICs), standard integrated circuits, controllers executing appropriate instructions, and including microcontrollers and/or embedded controllers, field-programmable gate arrays (FPGAs), complex programmable logic devices (CPLDs), and the like. Some or all of the system components and/or data structures may also be stored as contents (e.g., as executable or other machine-readable software instructions or structured data) on a computer-readable medium (e.g., a hard disk; memory; network; other computer-readable medium; or other portable media article to be read by an appropriate drive or via an appropriate connection, such as a DVD or flash memory device) to enable the computer-readable medium to execute or otherwise use or provide the contents to perform at least some of the described techniques. Some or all of the components and/or data structures may be stored on tangible, non-transitory storage mediums. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

The following sections describe a system named the "Link App," which includes an example embodiment of an ACES. It generally describes various architectural components, data flows, and other aspects of an example embodiment of an ACES used in a religious worship venue, including various processes used to implement an example ACES. It further describes various alternative or additional techniques that may be employed by various embodiments of an ACES. Other system organizations and process flows could also be used to implement the capabilities of an Ad-Hoc Community Engagement System. In addition, similar architecture, systems, organizations, and process follows can be used to implement other ACES type systems for other venues such as other religious, worship, or spiritual venues, music or art related venues, health clubs, medical facilities, recreation facilities, sports venues, or education or information related venues. Essentially, similar techniques, methods, and systems may be used to define an ad-hoc community engagement system for any physical venue whose participants change or fluctuate and whose opportunities or events vary based upon a variety of other factors such as time-of-date, calendar date, presence of others, needs of the community and the like.

Link App Overview

The Link App provides a way to build and strengthen a church community by engaging with visitors and members in a number of ways:

It provides a simple way to achieve specific, actionable goals—e.g., I want to connect with a pastor; I want to meet people my age; I want a mentor; I want to find a small group; I want to find places to serve;

It enables users to easily connect with other people based on mutual interests. For example, if a user indicated they were a parent and wanted to meet other parents at church, the information provided would enable Link App to match interested parents and notify users when other parents wanted to connect;

It broadcasts curated, prioritized information to help connect a person to things of particular interest to the person from service opportunities to activities at church and enables a means to send urgent notifications to all users;

It requires no personally identifiable information to get started and uses the phone's location only to trigger actions at church (e.g., inform a user of a need at church in an area they have previously expressed interest in; ask a user how the church can be praying for them upon exiting the building). One can optionally customize the app (e.g., by providing interests, age range, etc.) and thereby unlock more of its functionality.

It makes it easy to donate money to the church via a user's mobile device and provides detailed instructions on setting up and making gifts (one time or recurring).

Link App is a connector of people in real time to build real community by facilitating ad-hoc community engagement in a physical location. It is intended to work on a variety of hardware and operating system environments, although the screen displays shown herein are from an Apple iOS implementation.

Overall Functionality

The app utilizes the following functionality of a standard mobile device such as an end-user's phone:

Internet: required for all core Link App functionality including notifications (such as serving/event updates, meetup opportunities, emergency notifications), setting up mobile giving, and submitting prayer requests.

Bluetooth: Link App does not require the phone to be paired with any Bluetooth devices, but Bluetooth technology is used to detect arrival at and departure from the church and transition within parts of the church using beacons, for example Bluetooth low-energy beacons. In one embodiment, the beacons mounted in the church have a limited range (approx. 200 ft. max) and have no capacity to track which phones are receiving the signals.

Location permission: required for Link App to be able to detect the presence and signal strength of beacons. Location permission also enables Link App to read the GPS (Global Positioning System) location of the phone; GPS coordinates are currently used to confirm the departure of the person from church due to the variability of beacon signals.

Notification permission; enables the app to alert the user when Link App is in the background or when the phone screen is locked.

Background permission; enables Link App to process notifications and changes in location in the background.

First Launch

Initial installation and launching of Link App displays the splash screen, prompts for location and notification permissions and shows the initial setup screen. FIG. 5 is an example of an initial screen of the Link App application.

The initial setup screen 500 shown in FIG. 5 encourages the user to provide basic information to customize their experience in Link App from the beginning. No detailed personal data is requested (e.g., birthdate) and Link App does not require an email address or phone number be provided to start using it.

As the user becomes more comfortable with Link App and desires more customized functionality, the user can provide more detailed information (see below).

The initial settings are (currently):
Lifestage (one of): Student, Young Adult, Working Adult, Looking for Work, Parent at Home, Retired
Membership Status (one of): New, Occasional Visitor, Frequent Visitor, Member
Interests at church (one or more of): Worship, Meet New People, Bible Study, Prayer, Grow in Faith, Music, Serving Opportunities As noted, the user does not need to provide any information at this stage. When presented with this screen, one only need to press "<Belpres" or "Done" ("Belpres" is the name of the community in this example implementation). All information requested at this time may be provided later and information provided initially may be changed later.

Entering and Leaving Church

Based on location information (a combination of Bluetooth beacons and GPS as noted above), Link App knows when the user (the one holding the phone) is "at church". When the user enters church, a welcome page is shown. This page provides basic information about the church and what is happening at that time:
Services: if Sunday, list services; else text; button to link to upcoming worship page
Urgent needs: up to 3 top needs; same sources as needs below
Family/friends: up to 3 f/f that are already here; button to f/f setup page
Prayer requests: text+button to prayer page
Other events: other events for today; not shown if none; same format as events page with links When leaving the church (based on both the beacons and GPS), a "see you later" page is shown, thanking the person for coming and offering various follow up opportunities:
More info link: description+link to church home page
Giving link: description+button to give (same as giving page)
Prayer requests: description+button to prayer page Home Page The home page 600 (FIG. 6) provides access to all of the Link App functionality. The layout consists of two elements:
Tiles 601: select from one of several actions, of two types (basic and link), each with a distinct color
Tabs 602: select one of four major modes (bottom of screen on iOS) (e.g., Home, Notifications, Giving, Settings)

FIG. 6 is an example Home Page screen of the Link App application.
Basic tiles 601 are:
Worship (Goldenrod)
Give (Red)
Find (Green; cutoff in picture)
Link tiles 602 are:
Serve (Blue)
Meetup (Purple)
Learn/grow (Teal)
Pray (Brown)

Each tile 601 shown in FIG. 6 is described in further detail below. In other example Link App examples, other tiles may be incorporated such as, for example, a tile for watching live or recorded videos.

There are four tabs (five for an admin with appropriate permissions):
Home: shows the tiles as mentioned above
Notifications: shows all notifications from all parts of Link App in one sorted list
Giving: displays instructions and actions to make a donation to the church (currently same as the Give tile above)
Reports (if admin; not shown above): live reports of those using Link Apps (e.g., those in the community center at 9:45 am)
Settings: information about Link App, means to view and change any setting, and debug options should the need arise.

Anonymity

Link App is designed to make it easy and safe for people to connect in person (physically, not virtually like a social network). Thus, when people meet in person (facilitated by this app or otherwise), they are not anonymous. When they meet someone again or someone new, they are the same person each time they meet. This is fundamentally different than the foundation of the internet on which it has been said: "nobody knows you're a dog."

One of the ways Link App facilitates connecting people is through a matching process designed to offer specific opportunities or events to connect aligned with the needs and interests of the users involved. As part of the matching process, the user may provide some personal details such as demographic information, personality characteristics, and serving interests.

However, Link App requires no personally identifiable information to get started. The purpose of this approach is to:
1. Reduce the steps required to start learning the functionality of Link App
2. Start the process of the user trusting the purpose and good will behind Link App
3. Get some value from Link App as soon as possible Some functionality such as giving, creating an impromptu lunch out opportunity or registering for events, does require personal information such as a phone number. When a user selects an option or takes an action which requires more information, they will be prompted for that. The user may, at any time, change or withdraw the information provided; removing some information provided (e.g., phone number) requires uninstalling Link App. Installing Link App always starts with the same blank slate.

Worship

In the example Link App, the worship tile displays a categorized view of different types of worship available, such as from the church website or other third party source. Information shown for each type of worship may include a link to detailed information, link to live video feeds for use when one is not able to attend in person, and a list of upcoming worship and related events.

Give

The Give tile (and Giving tab) provide instructions on how to use the current mobile giving solution (through, for example, a third-party website designed for such; e.g., the "give.church" solution available online); this solution is also called Text-To-Give.

Giving to BelPres is done by sending text messages to the short number 45777. The instructions provided are in two parts: setup and donate.

Setup: Informs the user that pressing the setup button will create a text to be sent; specifically, to send the string "BelPres" to 45777. Taking this action (and actually sending the text) will result in a text message response containing a temporary web link. That link can be used to set up payment methods (e.g., credit card) or a reoccurring payment.

Donate: Choosing this action results in the creation of a text message addressed to 45777 containing an amount entered by the user and the text "BelPres". Pressing send on the text message will cause the donation to be made.

If the user has already pressed setup and does so again, the text message response will indicate no donation has been made and offer a means to set up a recurring donation. If one clicks the link, a web page is shown that allows one to make a donation.

If the user has not gone through the setup process and choses donate, the text response will provide a link, as in the setup case, to complete the setup.

Find

The initial version of the Find page will show a search box and search results from the church online website or other third party source.

Link Tiles

Three of the four link tiles (Serve, Meetup, Learn/Grow) operate in a common way using a common user interface scheme. The general flow is shown in FIG. 7.

That is, in the general flow 700, one selects a direction 701 and then one makes some choices 702 about specific ways to take next steps and then, for each of those choices, provides some attributes/interests 703 and then Link App offers a set of matches 704. Matching is done in a variety of ways depending on the case and is described in more detail below.

Some attributes such as Gender may be left unspecified in certain situations (e.g., when looking for a bible study). Other attributes also may be left unspecified.

FIG. 8 shows an example visual layout 800 for the MeetUp link tile.

While not shown in the figure, each of the choices (and thus a subset of the possible matches) may be pinned to the home page. Selecting this user added tile on the home page is a shortcut to this page which shows just those matches.

Serve

The Serve tile provides users with an easy way to find and be notified of BelPres related service opportunities. Serve Opportunities currently come from a third party source such as a particular page(s) on the online website of the church. This could be expanded to include other serving tags or any other feed or source of information.

In terms of the overall matching process, the serve opportunities are grouped into five areas as shown in FIG. 9.

Users who select the first two areas, the Church 901 and Community 902 categories, will be asked to answer a few questions to identify when they can serve (availability) and what their personality type is (personality attributes). The Link app will then propose matches with different opportunities and events based on the information provided.

Users who select the last three areas, the Church Family 903, Global 904 and Urgent 905 categories, require special handling and are explained in further detail below.

At Church/In Our Community

When the "At Church" 901 or "Community Outreach" 902 choices are selected, the page displays a message such as:

Awesome! We would LOVE your help!

If you already know where you would like to serve, swipe down to the Serving Opportunities below and press on the one you want.

If you're not sure where you would like to serve, let's figure out when you're available and what sorts of serve opportunities might be a good match for you:

The availability and other attributes questions presented to the requester to facilitate a match may include, for example:

1. Availability
   a. When are you available to help out?
      i. Mornings
      ii. Afternoons
      iii. Evenings
      iv. Weekends
      v. Sunday Only
      vi. Any time
      vii. A few hours a week
      viii. Depends on the day
2. Do you think of yourself more as a . . .
   a. Introvert—working alone or in a small group is your thing. You enjoy a deliberate pace and focusing on one thing at a time.
   b. Extrovert—being around people gives you energy. You enjoy a variety of tasks and are good at multi-tasking.
   c. Ambivert—you are a little of both.
3. When solving problems, you . . .
   a. Like to focus on the possibilities and the big pictures. Seeing patterns comes easy to you and you like to find creative/innovative solutions to problems.
   b. Are pretty realistic and like to focus on facts and details. You generally apply common sense and past experience to come up with practical solutions to problems.
4. When making a decision, you . . .
   a. Tend to be on the sensitive side and are cooperative. You make decisions based on your own personal values and how your decision will affect others.
   b. Make decisions using logical analysis and objectively weigh the pros and cons. Clean data is your friend.
5. When planning something you . . .
   a. Prefer to keep your options open. You like the freedom to be spontaneous and flexible.
   b. You like to make plans and stick to them. Being organized, prepared and following the rules is your thing.
6. If your neighborhood was having a huge garage sale, which task would you volunteer to manage?
   a. Set up all the tables and tidy up the yard.
   b. Organize all the items for sale.
   c. Take care of the kids while others manage the sale.
   d. Collaborate with several other neighbors to promote and advertise the garage sale.
   e. Work by yourself to price the items.

The answers to these questions are used by the matching algorithm to dynamically update a list of serving opportunities in real time to show what opportunities would be a good fit for that particular user based upon other attributes of the physical venue such as who else is present. See section on Matching below.

Church Family

The information displayed for Church Family Needs 903 is based on direction from the church (or third party source) and how the church would like users to respond. For example, in one example embodiment, if a user has a need they would like considered for placement in the Church Family Needs 903 the following text shows below Current Needs:

Do you have a need our church family might be able to help with? If so, please contact [church designated recipient].

The Church Family choice then would be populated with needs that are curated, for example, by church staff. This could include things like:
1. Meal delivery
2. Help with moving
3. Prayer requests
4. Housing needs
5. Clothing or goods donations
6. Etc.

Global

If the Global choice 904 is selected, user receives the following:

Nice! From building houses to spreading the good news, we've got lots of amazing opportunities to serve around the world.
Please select any to learn more . . .
1. Impact teams
   a. Guatemala
   b. Mexico
   c. Haiti
   d. Dominican Republic
   e. Russia
   f. Rwanda
   g. India
   h. Israel/Palestine
2. Disaster Response
   a. Beaumont, Tex.
   b. Texas
   c. Florida
   d. Puerto Rico
3. Consultations or Internships
4. Long term service opportunities
5. Global Leadership
6. Palestine/Israel Peacemaking
7. Rwanda Prayer Of note, the information displayed for Global also can be based on direction from the Church (or third party source) and on how the church would like users to respond.

Urgent

The Urgent 905 choice (like the Church Family choice above), is typically be populated with needs that are curated by church staff and could include opportunities and events like:
1. Need volunteer help in the CCC
2. Need a teacher at 9:45 for turning 4s
3. Need AV help at 11 Modern
4. Need parking lot help
5. And so on . . .

Urgent needs can also be targeted to specific user groups. For example, if there is an urgent need for a someone to bake cookies for a memorial, an Urgent need alert could be targeted to specific user groups.

The information displayed for Urgent needs can be based on direction from the Church and on how the church would like users to respond.

Matching

To match users to specific serve opportunities, Link App is using a custom variation of a personality type test such as the Myers-Briggs Personality Short Test to map existing opportunities and/or events to personality types suited for those roles. FIG. 10 is an example personality types "key" (index) for determining a category of personality type.

It should be noted, however, that this is not an exact science and the matching logic can be refined over time. A current mapping of personality types used to match serve opportunities by for the matching algorithm is described in Appendix A. These rules are combined with availability indicated by the user to perform matching. Thus, the matching algorithm provides more than keyword string matches to determine what ad-hoc opportunities and/or events are best suited to the requesting user. Note that the questions shown in Appendix A are the answers to question 6 above when the users are asked questions to indicate availability and attributes. (Other question/answer paradigms may be similarly incorporated.)

Serving Opportunities:

When Serve Opportunities are initially displayed they may contain a five-line preview of the opportunity. For example:

Serve Opportunity Title

Contact Name

Frequency/Service times/Service duration (where applicable)

Opportunity Description

For example, the "Coffee & Hospitality Team" opportunity may be displayed as:

Coffee & Hospitality Team

Contact: Jane Doe

When: Sunday at 9 am

Grind, brew, fill and refill coffee on Sunday mornings. No coffee experience needed. Ages 10 up are invited to join in on the fun!

Selecting a Serve Opportunity:

When the user selects a serve opportunity it expands to reveal more information:

Serve Opportunity Title

Contact Name

Frequency/Service times/Service duration (where applicable)

Opportunity Description

Four buttons at the bottom of the screen:

Contact (gives option to text, email, or call)

Share (gives option to text or email opportunity to others via pre-populated email or text)

Dismiss (removes the serve opportunity from the list)

MeetUp

The MeetUp tile offers the chance to connect with other people directly. Each person interested in this option indicates their interest by selecting a specific means to meet (choice) and by providing one or more attributes about themselves. Once chosen and specified, the Link App proposes matches based on the information provided by all parties.

The current choices for matching and the attributes/interests for the MeetUp Tile are shown in Table 1.

TABLE 1

MeetUp Tile Opportunities

| CHOICE | PURPOSE | ATTRIBUTES/INTERESTS | MATCHES |
|---|---|---|---|
| Find a Mentor | To seek a mentor for the user | Gender, Age range, Lifestage, Goals, Vocation | Based on complimentary attributes except age range (opposite) |
| Be a Mentor | To offer to be a mentor for others | <same as above> | <same as above>; may require prior approval to be matched |
| Meet New People | To meet new people (beyond family and friends) | Gender, Age Range, Lifestage, Neighborhood, Couple/Single; which attributes to match on | Based on attributes to match |
| Others with Similar Life Challenge | To find mutual support in a life challenge (1) | Health, Divorce, Financial, Grief, Loss of Job, Caregiver to Family/Friend, Widow/Widower, Addiction | Match same challenge area(s) |
| Lunch/coffee out after church | To implicitly invite others to lunch or coffee after church | Time frame (e.g., after service), Age Range, Lifestage, Dietary restrictions, Quick bite .vs. Meal | Similar attributes and timeframe |
| Find other parents | Find parents with similar aged kids and situations | Single/Married parents, Kids Ages, School District, Child with special needs | Similar attributes and needs |
| Talk to visitors at church and show them around | Just as it sounds | None | New people (who indicates interest) |
| Friends/family | To be notified when family/friends are here | Requires phone number set up and other person's phone number | When registered users show up at church |
| Meet Pastor | An impromptu meeting with a pastor (if available) | timeframe (e.g,. 20 min after 11 am service) | pastors which are available and accept (2) |

(1)
NOTE:
if urgent, call a pastor (phone number provided); if life threatening, call 911.
(2) Obviously requires that pastors have a way to indicate they are available and to accept the request Other matching rules maybe also incorporated such as the personality types.

Learn/Grow

The church supported by Link App has many opportunities to learn about and grow in one's faith. These opportunities include both scheduled, onetime events as well groups that meet on a regular or even ad-hoc basis (and may be dependent upon who is presently located in the physical venue). Generally, these opportunities are group-based and cover a wide range of needs and interests. The current choices for matching and the attributes/interests for the Learn/Grow Tile are shown in Table 2:

TABLE 2

Learn/Grow Tile Opportunities

| CHOICE | PURPOSE | ATTRIBUTES/INTERESTS | MATCHES |
|---|---|---|---|
| Small Groups | To assist in finding a small group | Frequency, Day/Time, Gender, Single/Couples, Lifestage, Geography, Topic | Matching groups which are accepting members |
| Bible Study | To assist in finding a bible study | <same as above> | <same as above> |
| Discipleship Study | To find classes which deepens one's faith | Gender, Topic (e.g., prayer, fasting) | Relevant upcoming classes |
| Support Group | To find support in groups with common needs | Health, Divorce, Financial, Grief, Loss of Job, Caregiver to Family/Friend, Widow/Widower, Addiction | Groups which are accepting new members |

TABLE 2-continued

Learn/Grow Tile Opportunities

| CHOICE | PURPOSE | ATTRIBUTES/INTERESTS | MATCHES |
| --- | --- | --- | --- |
| New Member Class | Prepare people for membership | Membership status | Upcoming classes |
| Parenting Class | Classes for parents | Single/Married, Kids Ages, School District, Child with special needs | Upcoming classes |
| Kids & Youth | List all the fun activities/ groups | Lifestage (student only), Grade, Topic/interests | Upcoming events and groups |
| Leadership | To connect users with leadership opportunities | TBD | Upcoming events and classes |
| Gathering for meals together | To encourage fellowship over a meal | Gender | Upcoming events |

Other matching rules maybe also incorporated such as the personality types.

Prayer Requests

The initial release of Link App will provide a means to submit a prayer request. This action will be equivalent to submitting a request to the online website page of the church designated for this purpose. The Name box will be pre-filled with the name provided in Link App and the phone number box will be filled in if the Link App knows the phone number. Both pre-filled values can be removed before submitting the prayer request.

It is contemplated that prayer requests will be shown on this page under specific conditions; for example:
1. For authorized parties (e.g., pastors), they will be able to review prayer requests on their phone on the Pray page. If a phone number is provided, the person viewing the request can initiate a text message or a phone call from within Link App.
2. Prayers which are intended to be broadcast to the community (indicated when submitted) and after an authorized party (e.g., pastors) approve the release, the prayer request will be shown to others.
3. People who view prayer requests that have been authorized must have provided basic identifying information (or may in fact need to be members of the church).

Settings

The settings tab of Link App shows information related to the installation of Link App, provides access to all settings for all features in Link App and enables the use of debug/help options.

Notifications

The notifications tab shows a combined list of all notifications from across the Link App in a time sequence (newest on top). The notifications are color coded based on the type (e.g., Meetup notifications are Purple). Notifications which have been read are shown grayed out. FIG. 11 is an example display of a notification screen 1100 for Link App.

Reports

Once the Link App is installed it begins reporting information to the ACES backend system (e.g., in Microsoft Azure or equivalent cloud-based backend facility). All information sent to the ACES backend is protected against unauthorized access.

The information uploaded includes, for example:
Unique number used to identify this particular installation of Link App (which is not otherwise related to anything about the phone or user; truly random)
Basic attributes of the device and the version of Link App in use
Phone number (if provided through a text-based registration process)
When/where Link App encounters beacons associated with the church venue
Settings required for the matching algorithm (e.g., for the MeetUp feature)
Detailed app usage information (if provided) to debug a problem Multiple beacons are placed in several areas of the church and the beacons in one area can be distinguished from beacons in another area. As noted, the phone records which church beacons are detected and uploads that information to the ACES backend.

Based on this information, the reports tab will show the following statistics to authorized persons:
1. Total number of app installations:
   a. Ever installed
   b. Active within the last week
2. Total number of phones at church which are running Link App:
   a. By date
   b. So far today
   c. Right now
   d. By area (e.g., community center)

In some releases, authorized parties are identified by phone number and thus they must register their phone with Link App and provide their phone number to someone who can grant them rights to see the reports.

Church-Provided Data

For the Link App to be fresh and relevant over time, the church or another third party provides certain data feeds and other functionality on a continuous basis:
Events with categories; links to registration
Small group information with categories; means to follow-up
List of Prayer requests and restrictions on visibility
List of Serving opportunities with categories; means to follow-up
Mobile-friendly Giving method
In-church search results (refinement of existing search)
Licensed graphic images From the foregoing it will be appreciated that, although specific embodiments have been described herein for purposes of illustration, various modifications may be made without deviating from the spirit and scope of the invention. For example, the methods and systems for automatically tracking, discovering, and publishing ad-hoc engagement discussed herein are applicable to other architectures other than an iOS, Windows, or Android architecture. Also, the methods and systems discussed herein are applicable to differing protocols, communication media (optical, wireless, cable, etc.) and devices (such as wireless handsets, electronic organizers, personal digital assistants, portable email machines, game machines, pagers, navigation devices such as GPS receivers, etc.).

The invention claimed is:

1. A method in a server computing system for facilitating automatic notification of ad-hoc opportunities and/or events in a physical venue, comprising:
determining presence and location of a plurality of mobile devices, each of which is detected and recognized as currently present in the physical venue using a combination of beacon technology and/or GPS signals;
determining, for each recognized mobile device, a set of attributes that characterize a corresponding user, wherein the set of attributes for each user is determined without reference to any personally identifiable information ("PII") of the corresponding user and without requiring the corresponding user to login or set up an account; and
for each corresponding current user of the recognized mobile devices,
identifying a current set of opportunities and/or events, each opportunity/event specific to the physical venue and specific to the corresponding current user without reference to any PII of the corresponding user and without, requiring the corresponding upon to login or set up an account, based upon a combination of all of the recognized current mobile devices at a current time in a particular geofenced area within the physical venue and a set of matching rules that determine which of the identified current set of opportunities and/or events best match the corresponding current user, wherein the matching rules comprise one or more rules that include string values corresponding to the set of characterizing attributes of the corresponding current user, location of the mobile device of the corresponding user, and/or a profile categorization of the corresponding current user; and
automatically notifying the corresponding current user of the identified current set of opportunities and/or events.

2. The method of claim 1 wherein the identified current set of opportunities and/or events is automatically organized and presented by the computer system based upon a shared user interface scheme that groups the opportunities/events into categories and within each category a set of choices, within each choice a set of attributes or interests, and within each attribute or interest a subset of the identifies current set of opportunities and/or events that match based upon the matching rules.

3. The method of claim 1 wherein the profile characterization of the corresponding current user profiles the corresponding user according a personality trait type scheme.

4. The method of claim 3 wherein the profile characterization of the corresponding current user is determined by receiving answers to a set of questions forwarded to the corresponding current user.

5. The method of claim 1 wherein the physical venue is one of a religious or spiritual venue, music venue, health club, medical facility, recreation facility, sport venue, an outdoor location, or education institute and the automatically notifying the corresponding current user of the identified current set of opportunities and/or events presents a common user interface scheme even when the identified current set of opportunities and/or events of one physical venue is different than those of another distinct physical venue.

6. The method of claim 5 wherein the common user interface scheme is a four level scheme comprising categories of opportunities and/or events, choices within categories, attributes or interests within a choice, and matching opportunities and/or events with an attribute or interest.

7. The method of claim 1 wherein the determining presence and location of a plurality of mobile devices, each of which is detected and recognized as currently present in the physical venue using a combination of beacon technology and/or GPS signals detects the presence and location of the plurality of mobile devices using beacons that are configured to detect mobile devices without tracking which mobile devices are receiving signals from the beacons.

8. The method of claim 7, further comprising:
preventing spoofing of beacon by disregarding a signal from a beacon recognized by a mobile phone when a GPS determined location of the mobile phone does not match the GPS location of the recognized beacon.

9. The method of claim 1 wherein, for each corresponding current user of the recognized mobile devices, the identifying the current set of opportunities and/or events specific to the physical venue and specific to the corresponding current user is enhanced by receiving a phone number for the corresponding current user.

10. The method of claim 9 wherein the received phone number for the corresponding current user is authenticated by receiving a value from a text message sent by the corresponding mobile device that uniquely identifies the phone and is not the International Mobile Equipment Identifier ("IMEI") of the mobile device and is not the PIID of the corresponding current user and wherein the value from the text message is automatically inserted by an application executing on the corresponding mobile device.

11. The method of claim 9 wherein, for each corresponding current user of the recognized mobile devices, the identifying the current set of opportunities and/or events specific to the physical venue and specific to the corresponding current user is further enhanced by receiving account information or registration information associated with the physical venue.

12. The method of claim 1 wherein, for each corresponding current user of the recognized mobile devices, the identified current set of opportunities and/or events comprise opportunities to provide assistance to other people in the physical venue, wherein the other people are previously unknown to the corresponding current user.

13. The method of claim 1, further comprising: for each corresponding current user of the recognized mobile devices, linking in information from other online resources connected with the physical venue and automatically using the linked information in the notifying the corresponding current user of the identified current set of opportunities and/or events.

14. The method of claim 1, further comprising: for each corresponding current user of the recognized mobile devices, receiving payment information from the corresponding current user and forwarding the received payment information to an external payment processing system to facilitate paying for at least one of the current opportunities and/or events identified for the current user.

15. A method in a client computing system mobile device for facilitating automatic notification of ad-hoc opportunities and/or events related to a physical venue, comprising:
  determining and recognizing one or more Bluetooth beacons in the physical venue and a GPS location and forwarding beacon location information and the GPS location to a server;
  determining and storing a set of attributes that characterize a corresponding user, wherein the set of attributes for a corresponding user is determined without reference to any personally identifiable information ("PII") of the corresponding user and without requiring the corresponding user to login or set up an account; and
  receive from the server a set of a current set of opportunities and/or events, each opportunity/event specific to the physical venue and specific to the corresponding current user without reference to any PII of the corresponding user and without requiring the corresponding user to login or set up an account, based upon a combination of all active devices in the venue at a current time in a particular geofenced area within the physical venue, the forwarded beacon and GPS location information, and a set of matching rules used by the server to determine which of the identified current set of opportunities and/or events best match the corresponding user, wherein the matching rules comprise one or more rules that include string values corresponding to the set of characterizing attributes of the corresponding user, location of the mobile device, and/or a profile categorization of the corresponding current user; and
  presenting the received current set of opportunities and/or events.

16. The method of claim 15 wherein the received current set of opportunities and/or events is ranked and sorted according to the interests and availability of the user and suitability of the opportunities and/or events.

17. The method of claim 15, further comprising:
  generating a globally unique identifier for identifying the mobile device to the server without requiring reference to any personally identifiable information ("PII") of the corresponding user and without a login or account setup.

18. A non-transitory computer-readable storage medium comprising instructions for controlling a computer processor to perform a method comprising:
  determining and recognizing one or more Bluetooth beacons in the physical venue and a GPS location and forwarding beacon location information and the GPS location to a server;
  determining and storing a set of attributes that characterize a corresponding user, wherein the set of attributes for a corresponding user is determined without reference to any personally identifiable information ("PII") of the corresponding user and without requiring the corresponding user to login or set up an account; and
  receive from the server a set of a current set of opportunities and/or events, each opportunity/event related to the physical venue and specific to the corresponding current user without reference to any PII of the corresponding user and without requiring the corresponding user to login or set up an account, based upon a combination of all active devices in the venue at a current time in a particular geofenced area within the physical venue, the forwarded beacon and GPS location information, and a set of matching rules used by the server to determine which of the identified current set of opportunities and/or events best match the corresponding user, wherein the matching rules comprise one or more rules that include string values corresponding to the set of characterizing attributes of the corresponding user, location of the mobile device, and/or a profile categorization of the corresponding current user; and
  presenting the received current set of opportunities and/or events.

19. A non-transitory computer-readable storage medium comprising instructions for controlling a computer processor to perform a method comprising:
  determining presence and location of a plurality of mobile devices, each of which is detected and recognized as currently present in the physical venue using a combination of beacon technology and/or GPS signals;
  determining, for each recognized mobile device, a set of attributes that characterize a corresponding user, wherein the set of attributes for each user is determined without reference to any personally identifiable information ("PII") of the corresponding user and without requiring the corresponding user to login or set up an account; and
  for each corresponding current user of the recognized mobile devices,
    identifying a current set of opportunities and/or events, each opportunity/event related to the physical venue and specific to the corresponding current user without reference to any PII of the corresponding user and without requiring the corresponding user to login or set up an account, based upon a combination of all of the recognized current mobile devices at a current time in a particular geofenced area within the physical venue and a set of matching rules that determine which of the identified current set of opportunities and/or events best match the corresponding current user, wherein the matching rules comprise one or more rules that include string values corresponding to the set of characterizing attributes of the corresponding current user, location of the mobile device of the corresponding user, and/or a profile categorization of the corresponding current user; and
    automatically notifying the corresponding current user of the identified current set of opportunities and/or events.

* * * * *